United States Patent [19]

Abel

[11] Patent Number: 5,011,034
[45] Date of Patent: Apr. 30, 1991

[54] GARDEN HOSE CONCEALING ARRANGEMENT INCLUDING INDEPENDENTLY USABLE LID

[76] Inventor: Don E. Abel, 4 Douglas Dr., Olney, Ill. 62450

[21] Appl. No.: 471,783

[22] Filed: Jan. 29, 1990

[51] Int. Cl.$^5$ .............................................. B65D 51/28
[52] U.S. Cl. ............................. 220/23.86; 220/23.83; 220/94 A; 220/521; 220/4.27; 206/423; 206/389; 206/457
[58] Field of Search .................... 220/23, 23.83, 23.86, 220/20, 1 V, 4 C, 94 A, 94 R, 521, 527, 528, 4.27; 206/423, 216, 457, 303, 389

[56] References Cited

U.S. PATENT DOCUMENTS

| | | | |
|---|---|---|---|
| 3,384,140 | 5/1968 | Brothers | 206/389 |
| 3,413,128 | 11/1968 | Steinbarth et al. | 220/23 |
| 3,545,642 | 12/1970 | Swett | 220/20 |
| 3,602,455 | 8/1971 | Lewis | 220/23 |
| 3,647,102 | 3/1972 | Cooley | 206/423 |
| 3,854,582 | 12/1974 | Martinelli | 220/94 A |
| 3,984,941 | 10/1976 | Chetta | 220/23 |
| 3,990,179 | 11/1976 | Johnson et al. | 220/4 C |
| 4,018,355 | 4/1977 | Ando | 220/23 |
| 4,387,534 | 6/1983 | Lewandowski et al. | 206/423 |
| 4,420,903 | 12/1983 | Ritter et al. | 206/423 |
| 4,601,403 | 7/1986 | Pollitz | 220/23 |

FOREIGN PATENT DOCUMENTS

| | | | |
|---|---|---|---|
| 1112358 | 6/1953 | France | 206/216 |
| 1262066 | 12/1961 | France | 220/23.83 |

*Primary Examiner*—Stephen Marcus
*Assistant Examiner*—S. Castellano
*Attorney, Agent, or Firm*—Warren D. Flackbert

[57] ABSTRACT

An arrangement for concealing a garden hose defined by a receptacle receiving the garden hose and an overlying lid. The lid, when in combination, serves garden hose concealment purposes, but, additionally, may be independently used. In any event, the lid presents a central post having a handle arrangement on the upper end thereof and surrounded by a space of sufficient depth to receive, for example, decorative potted plants. When assembled, an attractive unit is presented largely showing the plants and only fully revealing the garden hose after uncovering for full access to the receptacle.

4 Claims, 1 Drawing Sheet

GARDEN HOSE CONCEALING ARRANGEMENT INCLUDING INDEPENDENTLY USABLE LID

As is known, the usage of a garden hose, as around a home, is widespread, serving multiple needs and/or purposes. The presence of a garden hose dictates a corollary necessity for the storage of such, considering weathering, safety (as to avoid tripping) and neatness (as preventing unsightliness in any given area or location).

BACKGROUND OF THE INVENTION

The invention presents a receiving receptacle for the garden hose together with a receptacle lid which is of sufficient depth to serve utilitarian and/or decorative purposes in the yard or the like. In this connection, such a receptacle lid can serve to receive growing and/or flowering plants and is conveniently movable from location to location, as desired.

The combination of such a lid with a garden hose containing receptacle serves, therefore, multi-functions, i.e. to conceal the garden hose until desired usage and, at the same time, to present ornamentation in the form of an attractive unit adding coloring or the like to a particular site. While the aforesaid receptacle lid can be used in combination with the garden hose carrying-/concealing receptacle, a further feature might be in the use thereof by itself, i.e. merely to present and/or display a number of plants without the aforedescribed concealment purpose.

In other words, multiple features are provided herein, where a better understanding of the present invention will become more apparent from the following description, taken in conjunction with the accompanying drawing, wherein

Figure 1:
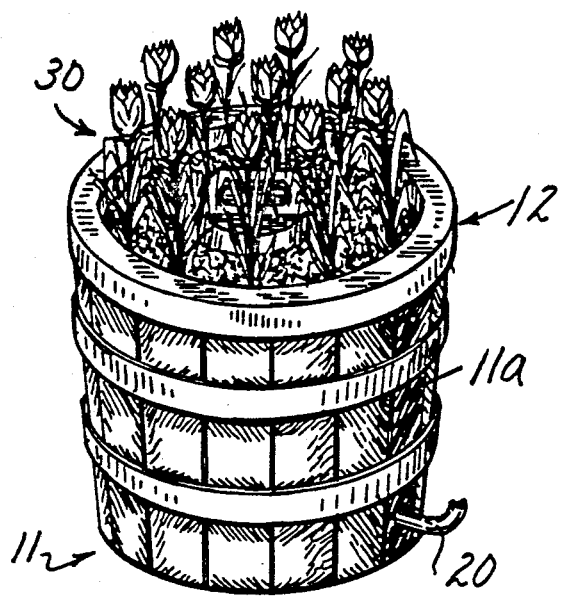
FIG. 1 is a perspective view showing a combination garden hose concealing arrangement and independently usable lid therefor in accordance with the teachings of the present invention.

For the purposes of promoting an understanding of the principles of the invention, reference will now be made to the embodiment illustrated in the drawing and specific language will be used to describe the same. It will nevertheless be understood that no limitations of the scope of the invention is thereby intended, such alterations and further modifications in the illustrated device, and such further applications of the principles of the invention as illustrated therein being contemplated as would normally occur to one skilled in the art to which the invention relate.

Figure 2:
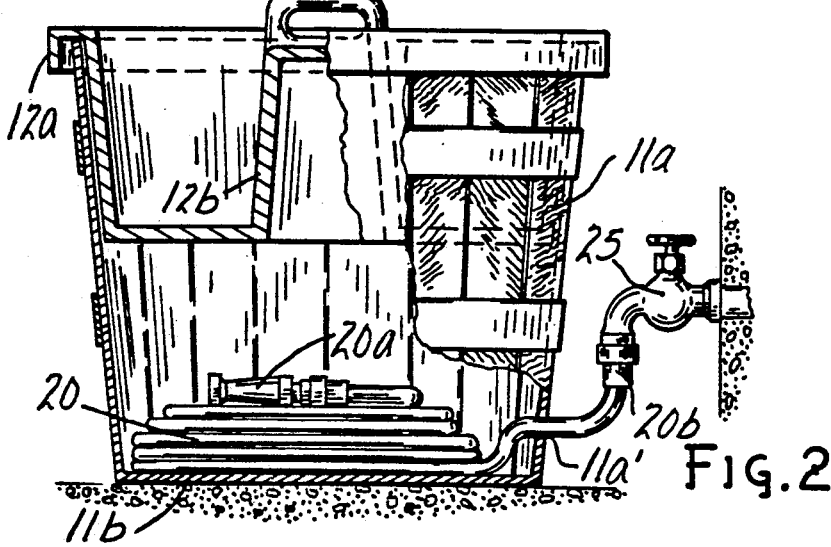
FIG. 2 is a view in front elevation, partly broken away, detailing the invention at a use condition; and, FIG. 3 is a top plan view, looking downwardly at line 3—3 on FIG. 2, further detailing the invention.

Referring now to the figures, and particularly FIGS. 1 and 2, the garden hose concealing arrangement of the invention is presented by a receptacle 11, typically having a continuous side wall 11a and a flat bottom wall 11b, where the latter serves to receive a coiled garden hose 20. One end of the latter includes a control nozzle 20a, while another end 20b extends through an opening 11a' in side wall 11a, connecting to a source of water, such as a faucet 25 (see FIG. 2). At this point, the garden hose 20 is carefully arranged in a layered relationship in contrast to being haphazardly strewn around a yard.

A lid 12 is provided for receptacle 11 and, typically, is presented with a downwardly depending edge portion 12a and a raised central portion or post 12b having a handle 20c defined on the upper surface thereof. In a preferred invention form, the lid 12 has sufficient depth to receive a series of potted plants 30, such as those shown in FIG. 1. Movement of the latter to various sites is readily accomplished through the use of handle 20c.

In other words, FIGS. 1 and 2 show a combination lid 12-receptacle 11 which serves positive garden hose 20 concealment purposes, and, at the same time, lends to on-site attractiveness.

Figure 3:
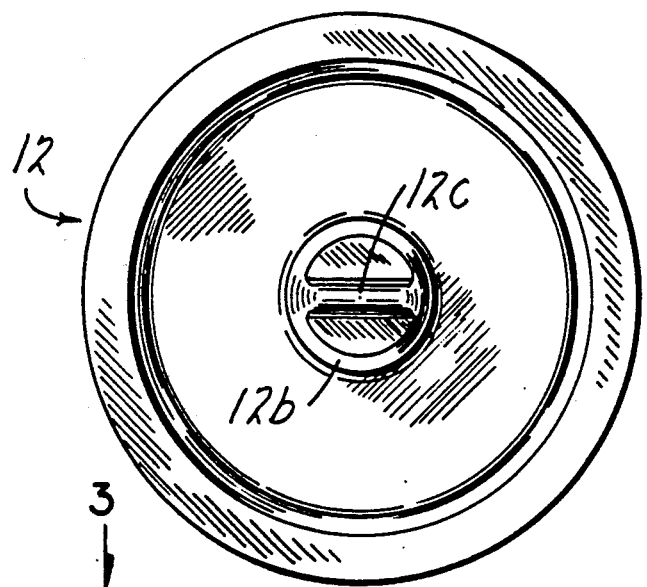

On the other hand, FIG. 3 demonstrates a further usage of the lid 12, i.e. independently of the receptacle 11. In other words, the independent use of the lid 11 of FIG. 3 can serve, for example, as an aggregation of garden plants movable to brighten any given area of a yard.

The lid 12-receptacle 11 of the invention is typically fabricated and/or molded from a plastic resin, such serving to provide a variety of end colors, strength, ease in cleaning and the like. In other words, the invention forms provide attractiveness to an area which may otherwise be deemed untidy.

The concealing arrangement disclosed herein is susceptible to various changes within the spirit of the invention, including, by way of example, in proportioning; in the configuration of the handle; the actual means of introducing the stored garden hose into the receptacle; the manner of securing the lid onto the receptacle other than by a press-fit, i.e. as through the use of latching means; and, the like. Thus, the preceding should be considered illustrative and not as limiting the scope of the following claims:

I claim:

1. An arrangement for concealing a garden hose comprising, in combination, a receptacle and said garden hose, said receptacle having a side wall including an upper edge and a bottom wall, said garden hose received on said bottom wall in a coiled and layered relationship, and a lid including a side wall and a flat bottom wall received on and hanging from said upper edge of said side wall of said receptacle and defined by a centrally disposed post including an upper surface and presenting space therearound of sufficient depth to receive vegetation, where handle means are presented on said centrally disposed post, where said lid is usable independently of said receptacle, and where said flat bottom wall thereof selectively rests on a supporting surface.

2. The arrangement of claim 1 where said handle means is presented on said upper surface of said centrally disposed post.

3. The arrangement of claim 1 where means is provided in said side wall of said receptacle for garden hose entry-exit.

4. The arrangement of claim 1 where said receptacle and said lid are each molded from a plastic resin.

* * * * *